Patented Sept. 11, 1951

2,567,747

UNITED STATES PATENT OFFICE 2,567,747

STABILIZATION OF ENZYME PREPARATIONS

Leo Wallerstein, New York, N. Y., Julius Pfannmuller, North Plainfield, N. J., and Alfons Noe, Staten Island, N. Y., assignors to Wallerstein Company, Inc., New York, N. Y., a corporation of New York No Drawing. Application March 18, 1948, Serial No. 15,728

12 Claims. (Cl. 195—63)

This invention relates to amylolytic enzyme preparations of improved keeping qualities.

Enzymes and enzymatic preparations which solubilize starch are now in general use. For example, they are commonly used in the so-called desizing of textiles for the removal of the starchy and dextrinous sizes from fibrous goods, and for the preparation of starch pastes and sizes. The size is applied to textiles to reduce the wear upon the threads during weaving operations but it must be removed before the dyeing or printing operations because of its interference with proper and uniform penetration of the dyes.

Enzymes used for modifying starch are of the amylolytic type. Their chemical constitutions are unknown. They are prepared from practically every type of living organism, for example, animal, vegetable, fungal and bacterial organisms. All these enzymes differ according to their origin, their specific characteristics and their action upon starch.

It can be stated, however, that all amylolytic enzymes are very sensitive to environmental conditions including hydrogen ion concentration, temperature, the presence of certain inhibitors or the presence of activators.

In the commercial application of these enzymes for desizing it is preferable to work at elevated temperatures as it is well known that at higher temperatures chemical reactions are accelerated. While all enzymes of the amylolytic type are rapidly destroyed at the atmospheric boiling point of aqueous solutions, the sensitiveness of the enzymes to temperatures below this limit varies greatly with each type of enzyme.

One characteristic of all enzymes is that their temperature stability is unlike that of most common chemicals. For instance, the enzymes lose their activity at ordinary room temperatures during long periods of storage, and in boiling aqueous solutions their activities are entirely destroyed in relatively short times. Generally this latter sensitiveness to heat while in aqueous solutions is referred to as the "heat stability" of the product in contradistinction to the stability against deterioration of activity during storage which is referred to as "storage stability" or "shelf life."

Heat stability is distinct and different from storage stability. Many heat stabilizers are known, such as calcium salts, sodium chloride, and the like. It is known that addition agents that improve heat stability do not necessarily extend the storage life of the enzyme product. They do not exert equivalent functions, nor can the results of one type of stability test be used to predict the effects upon the other type stability. Indeed, additives such as calcium salts that protect against loss of activity at elevated temperatures, and primarily in aqueous media, may tend to impair the storage stability of the enzyme.

The time range and the environment are entirely different for determining the active enzyme life with respect to heat stability or storage stability. The heat stability of an enzyme is measured under conditions simulating industrial application, namely, in a very dilute aqueous solution, the concentration of which is about 0.25% to 5.0% of the commercial enzyme preparation. Heat is applied to maintain the temperature above normal room temperature. The heat stability is usually expressed as the percentage of enzyme activity retained after exposure at an elevated temperature for a period of minutes or even a day at the most. On the other hand, tests for storage stability are made upon a commercial enzyme preparation without additional diluents and at temperatures simulating normal atmospheric conditions. Storage stability is usually measured and expressed as the percentage of activity retained in the preparation over a period of months.

It is the object of this invention to provide means for protecting amylolytic enzymes, particularly those of bacterial origin, against loss of activity during normal conditions of storage and transportation. Under these conditions, temperatures may run as high as 100° F. to 110° F. although shipping and storing instructions normally include the recommendation to store in a cool place. It is common knowledge that higher temperatures adversely influence the keeping qualities of enzyme preparations.

Enzymes and enzymatic preparations are sold in more or less concentrated solutions or as dry powders but in commercial applications they are generally diluted with large volumes of water and the solution is generally used at elevated temperatures.

An object of the invention is to provide an amylolytic enzyme or enzymatic preparation having enhanced storage stability. Other objects will appear in or be apparent from the following description:

We have found that the storage stability of amylase preparations may be substantially improved by incorporating therein substances of the general formula:

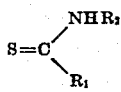

wherein $R_1$ represents hydrogen, alkyl, amino, alkylamino, aryl, alkenylamino, aralkylamino, arylamino, or thiocarbamyl and $R_2$ represents hydrogen, alkyl, alkenyl, aralkyl, aryl, acyl, or amino, or $R_1$ and $R_2$ together represent a bivalent alkylamine chain. Such substances are characterized by having a sulfur atom and at least one nitrogen atom directly attached to a carbon atom and may be considered as thioformamide and substitution products of thioformamide; they fall into two general classes: (a) thiocarboxylic acid amides and their N-substitution products, and (b) thiourea and its N-substitution products. Representative examples of such substances are: thioformamide, thiourea, allyl thiourea, phenyl thiourea, benzylthiourea, acetylthiourea, dithiobiuret, thiosemicarbazide, thiocetamide, N,N'-dibutyl thiourea, ethylene thiourea and N,N'-diethyl thiourea. Salts, mixtures or addition compounds of these substances are also effective in stabilizing the amylolytic enzyme.

The stabilizers of the invention may be added at any step of manufacturing commercial enzyme preparations, and if substantially removed by a subsequent step in manufacture additional quantities may be added to compensate for such removal.

The stabilizers, either in a vehicle or without a vehicle, may be intimately mixed with dry amylase preparations or they may be dissolved or dispersed in the liquid form of a commercial preparation of an enzyme. The improved storage stability resulting from the addition of such stabilizers is also obtained when the enzyme preparation contains other constituents such as organic or inorganic salts or other organic substances.

Only a very small amount of such addition agents is necessary for improving the storage stability of an enzyme product. Generally additions of 0.01% to 5% of the stabilizer, based upon the weight of the final composition, will effect a stabilizing influence but greater amounts are not deleterious. Typically, addition of from 0.1% to 1.0% are used.

Examples embodying the principles of this invention are given as further illustrations but are not to be construed as determining nor defining the limits of the invention.

In the examples to follow, the activities of the amylolytic enzyme preparations used in the tests are expressed in terms of numerical units. This activity represents the parts of starch liquefied by one part of the enzyme preparation under controlled standard conditions of substrate, concentration, pH, time and temperature to give a specific viscosity to the aqueous starch suspension acted upon by the enzyme.

Example 1

A bacterial amylase was prepared having an enzyme activity of 11,800 units. This enzyme preparation was divided into two parts, one of which remained untreated while to the other was added 0.1% by weight of finely divided thiourea which was uniformly distributed throughout the dry preparation. The two samples were stored at 100° F. to simulate severe storage conditions. After six months they were retested. The untreated enzyme preparation showed a retention of 71% of its original activity whereas the stabilized sample had retained 84%.

Example 2

A dry powdered bacterial amylase preparation was made and standardized to strength with powdered glue. It had an activity of 12,600 units. One part was retained as a control while to the other was added one part of thiourea by weight to 1000 parts of the enzyme preparation. Both samples were stored at 98° F. for 5¼ months. A retest at the end of this time showed that the untreated control sample had retained 72% of its original activity whereas 91% of the original activity was retained by the stabilized portion.

Example 3

To a dry powdered amylase preparation having an activity of 12,100 units was added 0.1% by weight of allyl thiourea. The thus treated sample was thoroughly mixed. The treated sample and an untreated control were stored at about 100° F. for three months. The treated sample retained 77% of its original activity as compared with a retention of only 41.5% for the control test.

Example 4

A portion of a dry amylase preparation with an original activity of 11,600 units was stored at about 100° F. for three months and was compared with its residual portion to which had been added 0.1% of phenyl thiourea, intimately mixed and similarly stored. The treated portion retained 77.1% of its activity and the untreated portion 41.5%.

Example 5

A dry amylase preparation having an original activity of 11,700 units retained 89% of its activity after storing for one month at 100° F., whereas the same material treated with 0.1% dithiobiuret and concurrently stored retained 91.7% activity.

Example 6

A dry amylase preparation had an original activity of 12,000 units and retained 69.2% activity after two months storage at 100° F. A portion treated with 0.2% by weight of thiosemicarbazide retained 88.5% of its activity during identical storage conditions.

Example 7

Under the same conditions as in Example 6, a portion of the same dry amylase preparation treated with 0.2% of thioacetamide retained 80.7% of its activity during the concurrent storage period.

Example 8

A bacterial amylase preparation in liquid form containing water was stored at 100° F. After one month it was found to have retained 42% of its original activity of 5,700 units, and less than 20% after two months at this temperature. When stabilized with 0.1% by weight of N,N'-dibutyl thiourea and stored under the same conditions at 100° F. it retained 54% of its original activity at the end of two months and 49% after three months.

We claim:

1. A stabilized enzymatic composition comprising an amylolytic enzyme and a substance of the group consisting of thioformamide and substitution products thereof in an amount ranging from 0.1% to 1.0% by weight and being effective to stabilize the enzyme.

2. A stabilized enzymatic composition comprising an amylolytic enzyme and a substance of the group consisting of thiocarboxylic acid amides and their N- substitution products in an amount ranging from 0.1% to 1.0% by weight and being effective to stabilize the enzyme.

3. A stabilized enzymatic composition comprising an amylolytic enzyme and a substance of the group consisting of thiourea and its N- substitution products in an amount ranging from 0.1% to 1.0% by weight and being effective to stabilize the enzyme.

4. A stabilized enzymatic composition comprising an amylolytic enzyme and thiourea in an amount effective to stabilize the enzyme.

5. A stabilized enzymatic composition comprising an amylolytic enzyme and allyl thiourea in an amount effective to stabilize the enzyme.

6. A stabilized enzymatic composition comprising an amylolytic enzyme and N,N'-dibutyl thiourea in an amount effective to stabilize the enzyme.

7. A stabilized enzymatic composition comprising a bacterial amylolytic enzyme and a substance of the group consisting of thioformamide and substitution products thereof in an amount ranging from 0.1% to 1.0% by weight and being effective to stabilize the enzyme.

8. A stabilized enzymatic composition comprising a bacterial amylolytic enzyme in substantially dry form and a substance of the group consisting of thioformamide and substitution products thereof in an amount ranging from 0.1% to 1.0% by weight and being effective to stabilize the enzyme.

9. A stabilized enzymatic composition comprising a bacterial amylolytic enzyme in substantially dry form and from 0.1% to 1.0% of thiourea.

10. A stabilized enzymatic composition comprising an amylolytic enzyme and a substance of the general formula:

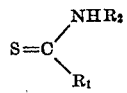

wherein $R_1$ is selected from the group consisting of hydrogen, alkyl, amino, alkylamino, alkenylamino and thiocarbamyl, $R_2$ is selected from the group consisting of hydrogen, alkyl, alkenyl, acyl and amino, and $R_1$ and $R_2$ together represent a bivalent alkylamine chain.

11. A stabilized enzymatic composition comprising an amylolytic enzyme and phenyl thiourea in an amount effective to stabilize the enzyme.

12. A stabilized enzymatic composition comprising an amylolytic enzyme and thiosemicarbazide in an amount effective to stabilize the enzyme.

LEO WALLERSTEIN.
JULIUS PFANNMULLER.
ALFONS NOE.

REFERENCES CITED

The following references are of record in the file of this patent:

UNITED STATES PATENTS

| Number | Name | Date |
|---|---|---|
| 2,093,865 | Denny | Sept. 21, 1937 |
| 2,333,956 | Schultz et al. | Nov. 6, 1943 |
| 2,336,928 | Denny | Dec. 14, 1943 |

OTHER REFERENCES

Tauber, Chemistry and Technology of Enzymes, 1949, published by John Wiley & Sons, Inc., New York, page 443.

Annual Review of Biochemistry, vol. 11, page 51 (1942) by Glick.